United States Patent
Ashok et al.

(10) Patent No.: US 9,658,874 B2
(45) Date of Patent: May 23, 2017

(54) SELECTING OPTIMAL HYPERVISOR PLATFORMS THAT SATISFY APPLICATION WORKLOAD REQUIREMENTS

(71) Applicant: International Business Machines Corporation, Armonk, NY (US)

(72) Inventors: Rohith K. Ashok, Natick, MA (US); Roy F. Brabson, Raleigh, NC (US); Rahul Ghosh, Morrisville, NC (US); David N. Nguyen, Wake Forest, NC (US); Aaron J. Quirk, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 94 days.

(21) Appl. No.: 14/307,947

(22) Filed: Jun. 18, 2014

(65) Prior Publication Data

US 2015/0370588 A1 Dec. 24, 2015

(51) Int. Cl.
*G06F 9/455* (2006.01)
*G06F 9/50* (2006.01)
(Continued)

(52) U.S. Cl.
CPC .......... *G06F 9/45558* (2013.01); *G06F 9/505* (2013.01); *G06F 9/5038* (2013.01);
(Continued)

(58) Field of Classification Search
CPC .............. G06F 9/45558; G06F 9/5038; G06F 11/3442; H04L 67/1008
See application file for complete search history.

(56) References Cited

U.S. PATENT DOCUMENTS 7,424,709 B2   9/2008 Neiger et al.
9,069,890 B2 * 6/2015 Kaiser ................. G06F 11/3442
(Continued)

OTHER PUBLICATIONS

Jinho Hwang et al., A Component-Based Performance Comparison of Four Hypervisors, IFIP, 2013, retrieved online on Jan. 11, 2017, pp. 269-276. Retrieved from the Internet: <URL: https://pdfs.semanticscholar.org/dd9e/e748917acced7540d53f5330dcefe6141726.pdf>.*

(Continued)

*Primary Examiner* — Tuan Q. Dann
*Assistant Examiner* — Hanh T Bui
(74) *Attorney, Agent, or Firm* — Robert A. Voigt, Jr.; Winstead, P.C.

(57) ABSTRACT

A method, system and computer program product for selecting hypervisor platforms that are best suited to process application workloads. Attribute requirements for an application workload, such as high CPU capacity, high power and low cost, are received. A ranking algorithm is then applied to a list of pools of compute nodes to identify an ordered list of pools of compute nodes that are best suited for satisfying the attribute requirements of the application workload by comparing hypervisor characteristics of the pools of compute nodes with the attribute requirements of the application workload. Each pool of compute nodes runs on a particular hypervisor platform which has a unique combination of characteristics that correspond to a combination of a set of attribute requirements (e.g., medium CPU/memory/disk capacity; high CPU and memory performance). In this manner, the hypervisor platforms that are best suited for satisfying the application workload requirements are identified.

14 Claims, 7 Drawing Sheets

(51) Int. Cl.
*H04L 12/24* (2006.01)
*H04L 29/08* (2006.01)
*H04W 4/00* (2009.01)
*H04W 4/02* (2009.01)

(52) U.S. Cl.
CPC ........ *G06F 9/5083* (2013.01); *H04L 41/5054* (2013.01); *H04L 67/10* (2013.01); *H04L 67/1008* (2013.01); *H04W 4/003* (2013.01); *H04W 4/02* (2013.01); *G06F 2009/4557* (2013.01)

(56) References Cited

U.S. PATENT DOCUMENTS

| | | | | |
|---|---|---|---|---|
| 2010/0228861 | A1* | 9/2010 | Arsovski | G06F 9/5027 709/226 |
| 2010/0275241 | A1* | 10/2010 | Srinivasan | G06F 9/468 726/1 |
| 2012/0005346 | A1 | 1/2012 | Burckart et al. | |
| 2012/0272234 | A1* | 10/2012 | Kaiser | G06F 11/3442 718/1 |
| 2013/0055251 | A1 | 2/2013 | Anderson et al. | |
| 2014/0040474 | A1* | 2/2014 | Blagodurov | G06F 9/5088 709/226 |
| 2014/0052768 | A1* | 2/2014 | Deng | H04L 67/42 709/201 |

OTHER PUBLICATIONS

Ghosh et al., "Modeling and Performance Analysis of Large Scale IaaS Clouds," Future Generation Computer Systems, vol. 29, Issue 5, Jul. 2013, pp. 1216-1234.

Nandi et al., "Stochastic VM Multiplexing for Datacenter Consolidation," 2012 IEEE Ninth International Conference on Services Computing, Jun. 24-29, 2012, pp. 114-121.

"Moab Cluster Suite," http://en.wikipedia.org/wiki/Moab_Cluster_Suite, 2012, p. 1.

Mell et al., "The NIST Definition of Cloud Computing," Special Publication 800-145, Sep. 2011, pp. 1-7.

Hotlink Corporation, "HotLink SuperVISOR for VMware vCenter," http://www.hotlink.com/resources/SuperVISOR_2.pdf, 2013, pp. 1-2.

EMC, Optimize Your Cloud Strategy to Lower Costs and Improve Business Agility, http://www.emc.com/collateral/software/service-overview/h8821-cloud-advisory-pub-sect-svo.pdf, 2013, pp. 1-3.

List of IBM Patents or Patent Applications Treated as Related, 2015, pp. 1-2.

Office Action for U.S. Appl. No. 14/609,681 dated Nov. 23, 2015, pp. 1-24.

Office Action for U.S Appl. No. 14/609,681 dated May 25, 2016, pp. 1-29.

Garg et al., "SMICloud: A Framework for Comparing and Ranking Cloud Services," Fourth IEEE International Conference on Utility and Cloud Computing, 2011, pp. 210-218.

* cited by examiner

US 9,658,874 B2

SELECTING OPTIMAL HYPERVISOR PLATFORMS THAT SATISFY APPLICATION WORKLOAD REQUIREMENTS

TECHNICAL FIELD

The present invention relates generally to cloud computing, and more particularly to selecting optimal hypervisor platforms that satisfy application workload requirements at workload provisioning time.

BACKGROUND

In a cloud computing environment, computing is delivered as a service rather than a product, whereby shared resources, software and information are provided to computers and other devices as a metered service over a network, such as the Internet. In such an environment, computation, software, data access and storage services are provided to users that do not require knowledge of the physical location and configuration of the system that delivers the services.

In a virtualized computer environment, such as may be implemented in a physical cloud computing node of the cloud computing environment, the virtualized computer environment includes a virtual operating system. The virtual operating system includes a common base portion and separate user portions that all run on a physical computer. The physical computer is referred to as a host. The common base portion may be referred to as a hypervisor and each user portion may be called a guest. Each guest is a logical partition of the physical resources of the computer. A guest operating system runs on each guest, and the guest appears to the guest operating system as a real computer. Each guest operating system may host one or more virtual machines.

Currently, functions of the cloud computing environment are performed at least in part by hardware components, such as blade servers, which may run different hypervisor platforms (e.g., PowerVM®, VMware® ESX, Open KVM). Each of these hypervisor platforms may exhibit strengths or weaknesses in comparison to the other hypervisor platforms. For example, one hypervisor platform may provide an effective input/output rate while having lower memory density in comparison to other hypervisor platforms. In another example, one hypervisor platform may provide the lowest overhead in Central Processing Unit (CPU) virtualization while having low disk performance in comparison to other hypervisor platforms. Similarly, application workloads (referring to the amount of processing that a hardware component has been given to do at a given time) that are provisioned on the cloud computing environment have different needs or requirements. For example, one application workload may be dependent on CPU computing efficiency while another application workload may be dependent on network latency.

Unfortunately, there is not currently a means for selecting the hypervisor platforms that are best suited for satisfying the application workload requirements. As a result, the application workloads may not be effectively processed.

BRIEF SUMMARY

In one embodiment of the present invention, a method for selecting hypervisor platforms that are best suited to process application workloads comprises receiving attribute requirements for an application workload. The method further comprises applying, by a processor, a ranking algorithm to a list of pools of compute nodes to identify an ordered list of pools of compute nodes that are best suited for satisfying the attribute requirements of the application workload by comparing hypervisor characteristics of the pools of compute nodes with the attribute requirements of the application workload. Each of the pools of compute nodes comprises a set of compute nodes that run on a particular hypervisor platform, where the particular hypervisor platform has a unique combination of characteristics that correspond to a combination of a set of attribute requirements. Additionally, the method comprises displaying the ordered list of pools of compute nodes that are best suited for satisfying the attribute requirements of the application workload.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE SEVERAL VIEWS OF THE DRAWINGS

A better understanding of the present invention can be obtained when the following detailed description is considered in conjunction with the following drawings, in which.

DETAILED DESCRIPTION

Figure 1:
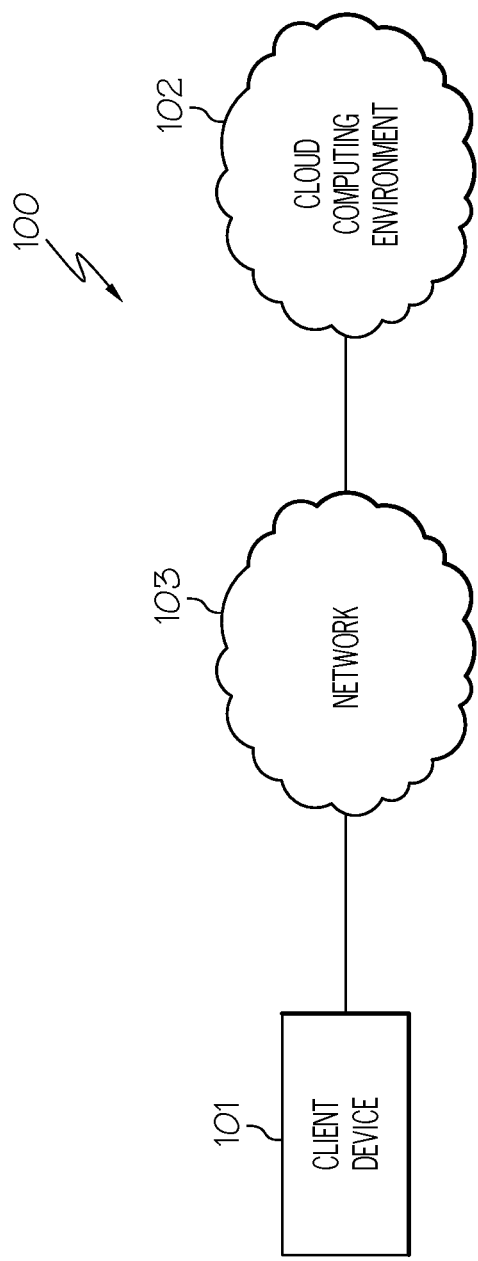
FIG. 1 illustrates a network system configured in accordance with an embodiment of the present invention.

The present invention comprises a method, system and computer program product for selecting hypervisor platforms that are best suited to process application workloads. In one embodiment of the present invention, attribute requirements for an application workload, such as high CPU capacity, high power and low cost, are received. A ranking algorithm is then applied to a list of pools of compute nodes to identify an ordered list of pools of compute nodes that are best suited for satisfying the attribute requirements of the application workload by comparing hypervisor characteristics of the pools of compute nodes with the attribute requirements of the application workload. Each pool of compute nodes runs on a particular hypervisor platform which has a unique combination of characteristics that correspond to a combination of a set of attribute requirements (e.g., medium CPU/memory/disk capacity; high CPU and memory performance; low disk performance; medium cost; high power; and a low guarantee on SLA policies). The ordered list of pools of compute nodes that are best suited for satisfying the attribute requirements of the application workload are then displayed. In this manner, the hypervisor platforms that are best suited for satisfying the application workload requirements are identified.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

It is understood in advance that although this disclosure includes a detailed description on cloud computing, implementation of the teachings recited herein are not limited to a cloud computing environment. Rather, the embodiments of the present invention are capable of being implemented in conjunction with any type of clustered computing environment now known or later developed.

In any event, the following definitions have been derived from the "The NIST Definition of Cloud Computing" by Peter Mell and Timothy Grance, dated September 2011, which is cited on an Information Disclosure Statement filed herewith, and a copy of which is provided to the U.S. Patent and Trademark Office.

Cloud computing is a model for enabling ubiquitous, convenient, on-demand network access to a shared pool of configurable computing resources (e.g., networks, servers, storage, applications, and services) that can be rapidly provisioned and released with minimal management effort or service provider interaction. This cloud model is composed of five essential characteristics, three service models, and four deployment models.

Characteristics are as follows:

On-Demand Self-Service: A consumer can unilaterally provision computing capabilities, such as server time and network storage, as needed, automatically without requiring human interaction with each service's provider.

Broad Network Access: Capabilities are available over a network and accessed through standard mechanisms that promote use by heterogeneous thin or thick client platforms (e.g., mobile phones, tablets, laptops and workstations).

Resource Pooling: The provider's computing resources are pooled to serve multiple consumers using a multi-tenant model, with different physical and virtual resources dynamically assigned and reassigned according to consumer demand. There is a sense of location independence in that the consumer generally has no control or knowledge over the exact location of the provided resources but may be able to specify location at a higher level of abstraction (e.g., country, state or data center). Examples of resources include storage, processing, memory and network bandwidth.

Rapid Elasticity: Capabilities can be elastically provisioned and released, in some cases automatically, to scale rapidly outward and inward commensurate with demand. To the consumer, the capabilities available for provisioning often appear to be unlimited and can be purchased in any quantity at any time.

Measured Service: Cloud systems automatically control and optimize resource use by leveraging a metering capability at some level of abstraction appropriate to the type of service (e.g., storage, processing, bandwidth and active user accounts). Resource usage can be monitored, controlled and reported providing transparency for both the provider and consumer of the utilized service.

Service Models are as follows:

Software as a Service (SaaS): The capability provided to the consumer is to use the provider's applications running on a cloud infrastructure. The applications are accessible from various client devices through either a thin client interface, such as a web browser (e.g., web-based e-mail) or a program interface. The consumer does not manage or control the underlying cloud infrastructure including network, servers, operating systems, storage, or even individual application capabilities, with the possible exception of limited user-specific application configuration settings.

Platform as a Service (PaaS): The capability provided to the consumer is to deploy onto the cloud infrastructure consumer-created or acquired applications created using programming languages, libraries, services and tools supported by the provider. The consumer does not manage or control the underlying cloud infrastructure including networks, servers, operating systems or storage, but has control over the deployed applications and possibly configuration settings for the application-hosting environment.

Infrastructure as a Service (IaaS): The capability provided to the consumer is to provision processing, storage, networks and other fundamental computing resources where the consumer is able to deploy and run arbitrary software, which can include operating systems and applications. The consumer does not manage or control the underlying cloud infrastructure but has control over operating systems, storage and deployed applications; and possibly limited control of select networking components (e.g., host firewalls).

Deployment Models are as follows:

Private Cloud: The cloud infrastructure is provisioned for exclusive use by a single organization comprising multiple consumers (e.g., business units). It may be owned, managed and operated by the organization, a third party or some combination of them, and it may exist on or off premises.

Community Cloud: The cloud infrastructure is provisioned for exclusive use by a specific community of consumers from organizations that have shared concerns (e.g., mission, security requirements, policy and compliance considerations). It may be owned, managed and operated by one or more of the organizations in the community, a third party, or some combination of them, and it may exist on or off premises.

Public Cloud: The cloud infrastructure is provisioned for open use by the general public. It may be owned, managed and operated by a business, academic or government organization, or some combination of them. It exists on the premises of the cloud provider.

Hybrid Cloud: The cloud infrastructure is a composition of two or more distinct cloud infrastructures (private, community or public) that remain unique entities, but are bound together by standardized or proprietary technology that enables data and application portability (e.g., cloud bursting for load balancing between clouds).

Referring now to the Figures in detail, FIG. 1 illustrates a network system 100 configured in accordance with an embodiment of the present invention. Network system 100 includes a client device 101 connected to a cloud computing environment 102 via a network 103. Client device 101 may be any type of computing device (e.g., portable computing unit, Personal Digital Assistant (PDA), smartphone, laptop computer, mobile phone, navigation device, game console, desktop computer system, workstation, Internet appliance and the like) configured with the capability of connecting to cloud computing environment 102 via network 103.

Network 103 may be, for example, a local area network, a wide area network, a wireless wide area network, a circuit-switched telephone network, a Global System for Mobile Communications (GSM) network, Wireless Application Protocol (WAP) network, a WiFi network, an IEEE 802.11 standards network, various combinations thereof, etc. Other networks, whose descriptions are omitted here for brevity, may also be used in conjunction with system 100 of FIG. 1 without departing from the scope of the present invention.

Cloud computing environment 102 is used to deliver computing as a service to client device 101 implementing the model discussed above. An embodiment of cloud computing environment 102 is discussed below in connection with FIG. 2.

Figure 2:
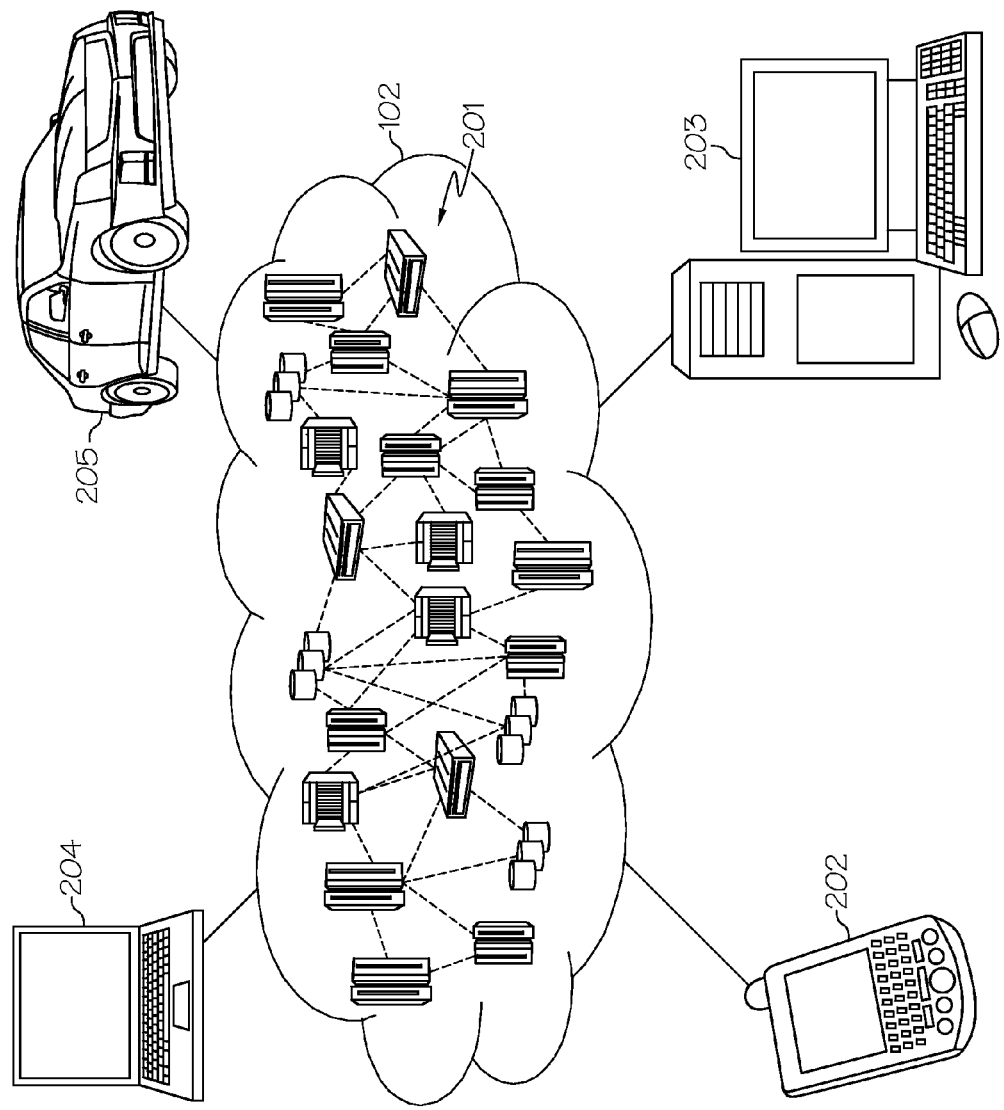
FIG. 2 illustrates a cloud computing environment in accordance with an embodiment of the present invention.

FIG. 2 illustrates cloud computing environment 102 in accordance with an embodiment of the present invention. As shown, cloud computing environment 102 includes one or more cloud computing nodes 201 (also referred to as "clusters") with which local computing devices used by cloud consumers, such as, for example, Personal Digital Assistant (PDA) or cellular telephone 202, desktop computer 203, laptop computer 204, and/or automobile computer system 205 may communicate. Nodes 201 may communicate with one another. They may be grouped (not shown) physically or virtually, in one or more networks, such as Private, Community, Public, or Hybrid clouds as described hereinabove, or a combination thereof. This allows cloud computing environment 102 to offer infrastructure, platforms and/or software as services for which a cloud consumer does not need to maintain resources on a local computing device. Cloud computing nodes 201 may include one or more racks of compute nodes (e.g., servers) that are managed by a server (referred to herein as the "administrative server") in cloud computing environment 102 as discussed below in greater detail in connection with FIG. 3.

It is understood that the types of computing devices 202, 203, 204, 205 shown in FIG. 2, which may represent client device 101 of FIG. 1, are intended to be illustrative and that cloud computing nodes 201 and cloud computing environment 102 can communicate with any type of computerized device over any type of network and/or network addressable connection (e.g., using a web browser). Program code located on one of nodes 201 may be stored on a computer recordable storage medium in one of nodes 201 and downloaded to computing devices 202, 203, 204, 205 over a network for use in these computing devices. For example, a server computer in computing nodes 201 may store program code on a computer readable storage medium on the server computer. The server computer may download the program code to computing device 202, 203, 204, 205 for use on the computing device.

Figure 3:
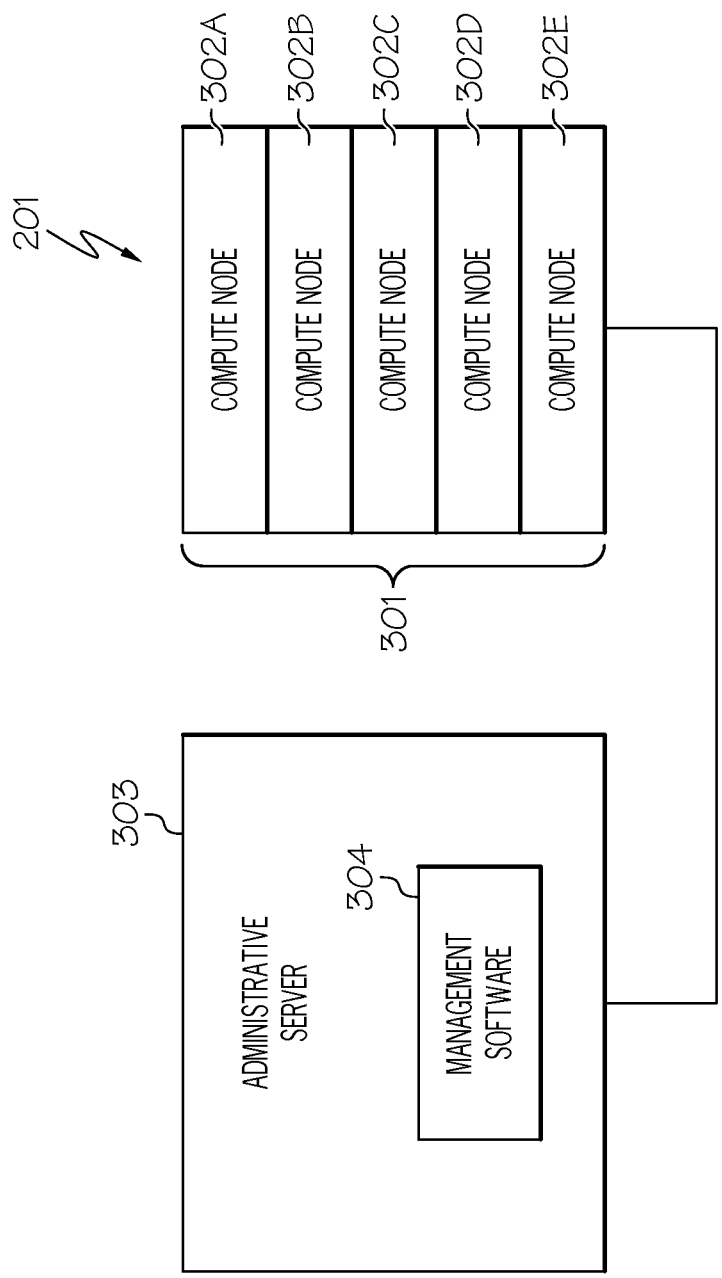
FIG. 3 illustrates a schematic of a rack of compute nodes of the cloud computing node that is managed by an administrative server in accordance with an embodiment of the present invention.

Referring now to FIG. 3, FIG. 3 illustrates a schematic of a rack of compute nodes (e.g., servers) of a cloud computing node 201 that are managed by an administrative server in accordance with an embodiment of the present invention.

As shown in FIG. 3, cloud computing node 201 may include a rack 301 of hardware components or "compute nodes," such as servers or other electronic devices. For example, rack 301 houses compute nodes 302A-302E. Compute nodes 302A-302E may collectively or individually be referred to as compute nodes 302 or compute node 302, respectively. An illustrative virtualization environment for compute node 302 is discussed further below in connection with FIG. 4. FIG. 3 is not to be limited in scope to the number of racks 301 or compute nodes 302 depicted. For example, cloud computing node 201 may be comprised of any number of racks 301 which may house any number of compute nodes 302. Furthermore, while FIG. 3 illustrates rack 301 housing compute nodes 302, rack 301 may house any type of computing component that is used by cloud computing node 201. Furthermore, while the following discusses compute node 302 being confined in a designated rack 301, it is noted for clarity that compute nodes 302 may be distributed across cloud computing environment 102 (FIGS. 1 and 2).

As discussed in further detail below, a pool or a set of compute nodes 302 (e.g., compute nodes 302A-302B) runs on a particular hypervisor platform (e.g., PowerVM®, VMware® ESX, Open KVM) with a unique combination of characteristics that correspond to a combination of rating levels for possible attributes of an application workload. For example, attributes of an application workload may include, but not limited to, Central Processing Unit (CPU) capacity, memory capacity, disk capacity, network capacity, CPU performance, memory performance, disk performance, network performance, power consumption, cost of service, reliability requirements and Service Level Agreement (SLA) policies. The particular hypervisor platform may be rated based on how well they perform or satisfy these attributes. For example, a hypervisor platform may be rated as providing "high" CPU and memory performance but rated as providing "low" disk performance. In another example, a hypervisor platform may be rated as providing "medium" CPU/memory/disk capacity while providing "medium" cost, "high" power and "low" guarantee on SLA policies. The hypervisor platform in each pool of compute nodes 302 may possess unique characteristics. That is, the hypervisor platform in each pool of compute nodes 302 may include a unique combination of rating levels for possible attributes of an application workload.

As discussed above, cloud computing environment 102 may include any number of cloud computing nodes 201, where each cloud computing node may include any number of racks 301 of compute nodes 302. Cloud computing environment 102 may include any number of pools of compute nodes 302 (e.g., compute nodes 302A-302B may represent one pool of compute nodes; whereas, compute nodes 302C-302E may represent another pool of compute nodes), where each pool or set of compute nodes 302 runs on a particular hypervisor platform (e.g., PowerVM®, VMware® ESX, Open KVM) that may include a unique combination of rating levels for possible attributes of an application workload.

As further shown in FIG. 3, rack 301 is coupled to an administrative server 303 configured to provide data center-level functions. Administrative server 303 supports a module, referred to herein as the management software 304, that can be used to manage all the compute nodes 302 of cloud computing node 201, monitor system utilization, intelligently deploy images of data and optimize the operations of cloud computing environment 102. Furthermore, management software 304 may be used to select the hypervisor platforms in the pools of compute nodes 302 that are best suited for satisfying the application workload requirements as discussed further below. A description of the hardware configuration of administrative server 303 is provided further below in connection with FIG. 5.

Figure 4:
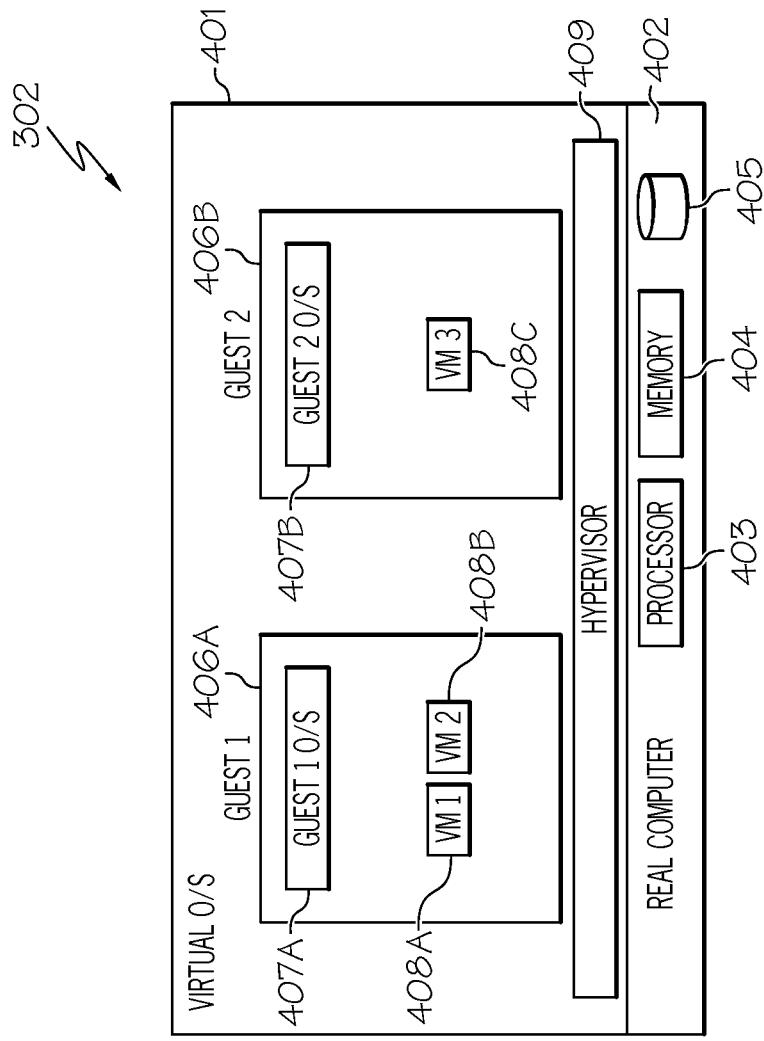
FIG. 4 illustrates a virtualization environment for a compute node in accordance with an embodiment of the present invention.

Referring now to FIG. 4, FIG. 4 illustrates a virtualization environment for compute node 302 (FIG. 3) in accordance with an embodiment of the present invention. Compute node 302 includes a virtual operating system 401. Operating system 401 executes on a real or physical computer 402. Real computer 402 includes one or more processors 403, a memory 404 (also referred to herein as the host physical memory), one or more disk drives 405 and the like. Other components of real computer 402 are not discussed herein for the sake of brevity.

Virtual operating system 401 further includes user portions 406A-406B (identified as "Guest 1" and "Guest 2," respectively, in FIG. 4), referred to herein as "guests." Each guest 406A, 406B is capable of functioning as a separate system. That is, each guest 406A-406B can be independently reset, host a guest operating system 407A-407B, respectively, (identified as "Guest 1 O/S" and "Guest 2 O/S," respectively, in FIG. 4) and operate with different programs. An operating system or application program running in guest 406A, 406B appears to have access to a full and complete system, but in reality, only a portion of it is available. Guests 406A-406B may collectively or individually be referred to as guests 406 or guest 406, respectively. Guest operating systems 407A-407B may collectively or individually be referred to as guest operating systems 407 or guest operating system 407, respectively.

Each guest operating system 407A, 407B may host one or more virtual machine applications 408A-408C (identified as "VM 1," "VM 2" and "VM 3," respectively, in FIG. 4), such as Java™ virtual machines. For example, guest operating system 407A hosts virtual machine applications 408A-408B. Guest operating system 407B hosts virtual machine application 408C. Virtual machines 408A-408C may collectively or individually be referred to as virtual machines 408 or virtual machine 408, respectively.

Virtual operating system 401 further includes a common base portion 409, referred to herein as a hypervisor. Hypervisor 409 may be implemented in microcode running on processor 403 or it may be implemented in software as part of virtual operating system 401. Hypervisor 409 is configured to manage and enable guests 406 to run on a single host. As discussed above, a pool of compute nodes 302 runs on a particular hypervisor platform 409 (e.g., PowerVM®, VMware® ESX, Open KVM) that may include a unique combination of rating levels for possible attributes of an application workload. For example, if compute nodes 302A-302B represent a pool of compute nodes 302, then compute nodes 302A-302B each run on the same hypervisor platform 409 (e.g., PowerVM®).

As discussed above, virtual operating system 401 and its components execute on physical or real computer 402. These software components may be loaded into memory 404 for execution by processor 403.

The virtualization environment for compute node 302 is not to be limited in scope to the elements depicted in FIG. 4. The virtualization environment for compute node 302 may include other components that were not discussed herein for the sake of brevity.

Figure 5:
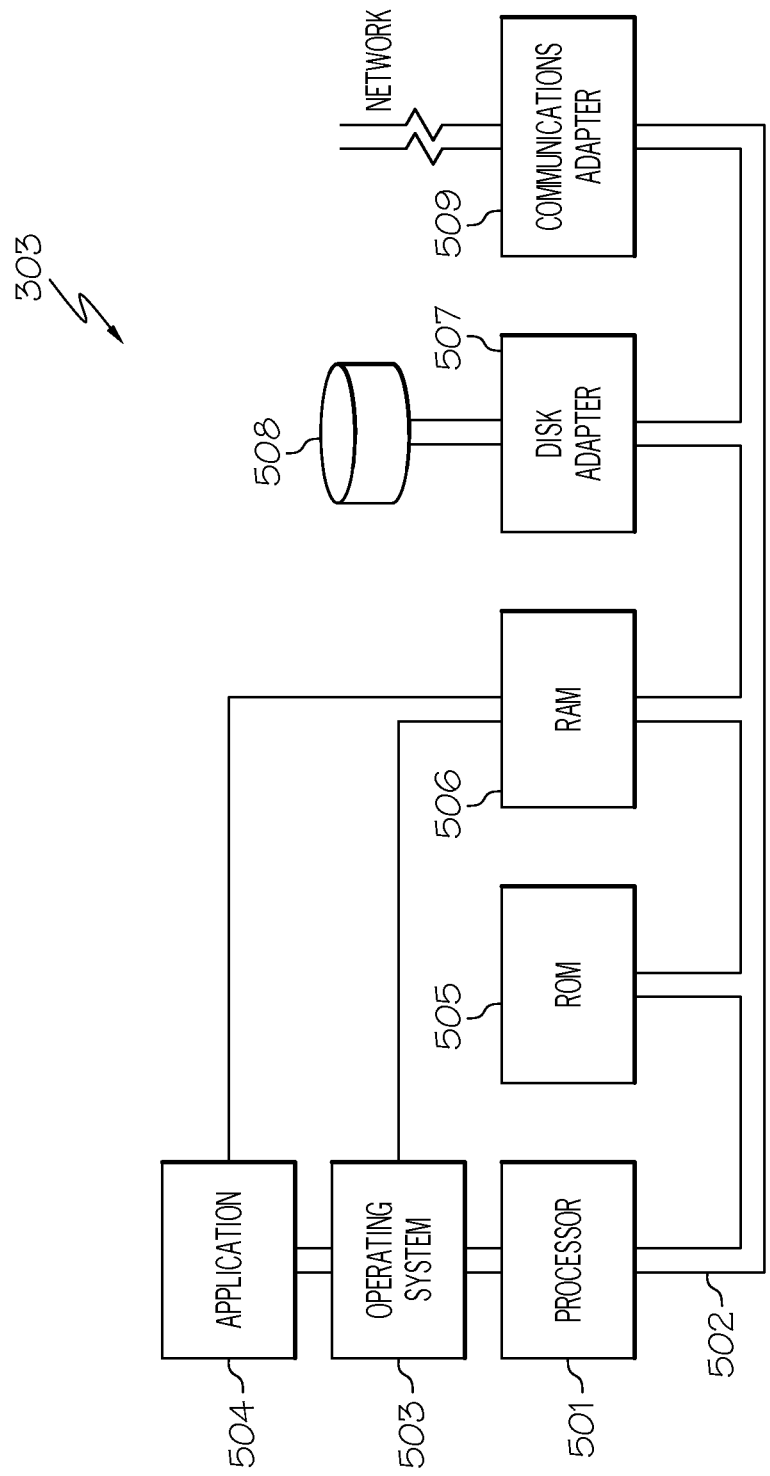
FIG. 5 illustrates a hardware configuration of an administrative server configured in accordance with an embodiment of the present invention.

Referring now to FIG. 5, FIG. 5 illustrates a hardware configuration of administrative server 303 (FIG. 3) which is representative of a hardware environment for practicing the present invention. Administrative server 303 has a processor 501 coupled to various other components by system bus 502. An operating system 503 runs on processor 501 and provides control and coordinates the functions of the various components of FIG. 5. An application 504 in accordance with the principles of the present invention runs in conjunction with operating system 503 and provides calls to operating system 503 where the calls implement the various functions or services to be performed by application 504. Application 504 may include, for example, a program (e.g., management software 304 of FIG. 3) for selecting the hypervisor platforms 409 in the pools of compute nodes 302 that are best suited for satisfying the application workload requirements as discussed further below in association with FIGS. 6 and 7.

Referring again to FIG. 5, read-only memory ("ROM") 505 is coupled to system bus 502 and includes a basic input/output system ("BIOS") that controls certain basic functions of administrative server 303. Random access memory ("RAM") 506 and disk adapter 507 are also coupled to system bus 502. It should be noted that software components including operating system 503 and application 504 may be loaded into RAM 506, which may be administrative server's 303 main memory for execution. Disk adapter 507 may be an integrated drive electronics ("IDE") adapter that communicates with a disk unit 508, e.g., disk drive. It is noted that the program for selecting the hypervisor platforms 409 in the pools of compute nodes 302 that are best suited for satisfying the application workload requirements, as discussed further below in association with FIGS. 6 and 7, may reside in disk unit 508 or in application 504.

Administrative server 303 may further include a communications adapter 509 coupled to bus 502. Communications adapter 509 interconnects bus 502 with an outside network (e.g., network 103 of FIG. 1).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As stated in the Background section, in a virtualized computer environment, such as may be implemented in a physical cloud computing node of the cloud computing environment, the virtualized computer environment includes a virtual operating system. The virtual operating system includes a common base portion and separate user portions that all run on a physical computer. The physical computer is referred to as a host. The common base portion may be referred to as a hypervisor and each user portion may be called a guest. Each guest is a logical partition of the physical resources of the computer. A guest operating system runs on each guest, and the guest appears to the guest operating system as a real computer. Each guest operating system may host one or more virtual machines. Currently, functions of the cloud computing environment are performed at least in part by hardware components, such as blade servers, which may run different hypervisor platforms (e.g., PowerVM®, VMware® ESX, Open KVM). Each of these hypervisor platforms may exhibit strengths or weakness in comparison to the other hypervisor platforms. For example, one hypervisor platform may provide an effective input/output rate while having lower memory density in comparison to other hypervisor platforms. In another example, one hypervisor platform may provide the lowest overhead in Central Processing Unit (CPU) virtualization while having low disk performance in comparison to other hypervisor platforms. Similarly, application workloads (referring to the amount of processing that a hardware component has been given to do at a given time) that are provisioned on the cloud computing environment have different needs or requirements. For example, one application workload may be dependent on CPU computing efficiency while another application workload may be dependent on network latency. Unfortunately, there is not currently a means for selecting the hypervisor platforms that are best suited for satisfying the application workload requirements. As a result, the application workloads may not be effectively processed.

Figure 6:
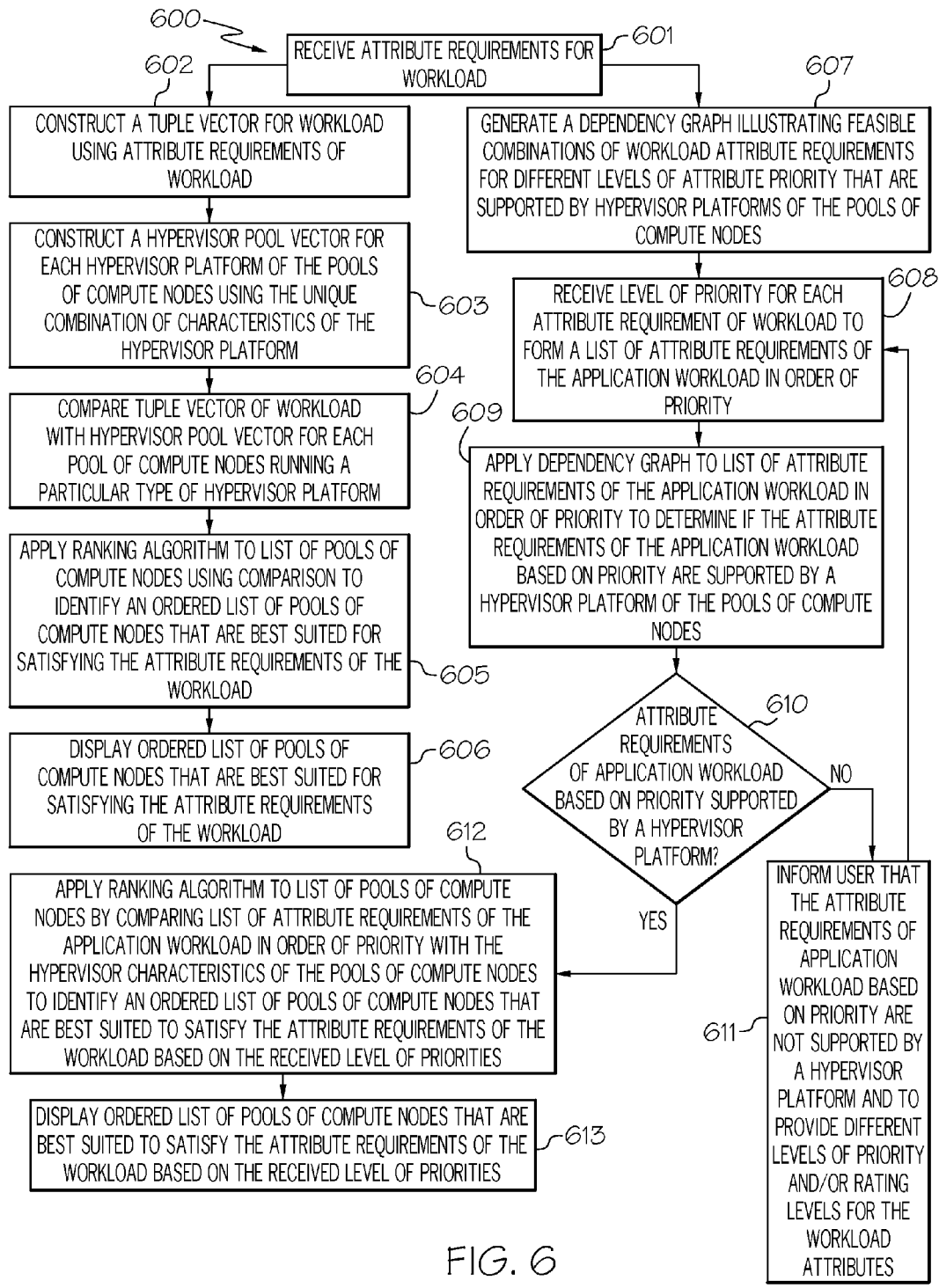
FIG. 6 is a flowchart of a method for selecting the hypervisor platforms that are best suited for satisfying the application workload requirements in accordance with an embodiment of the present invention.
Figure 7:
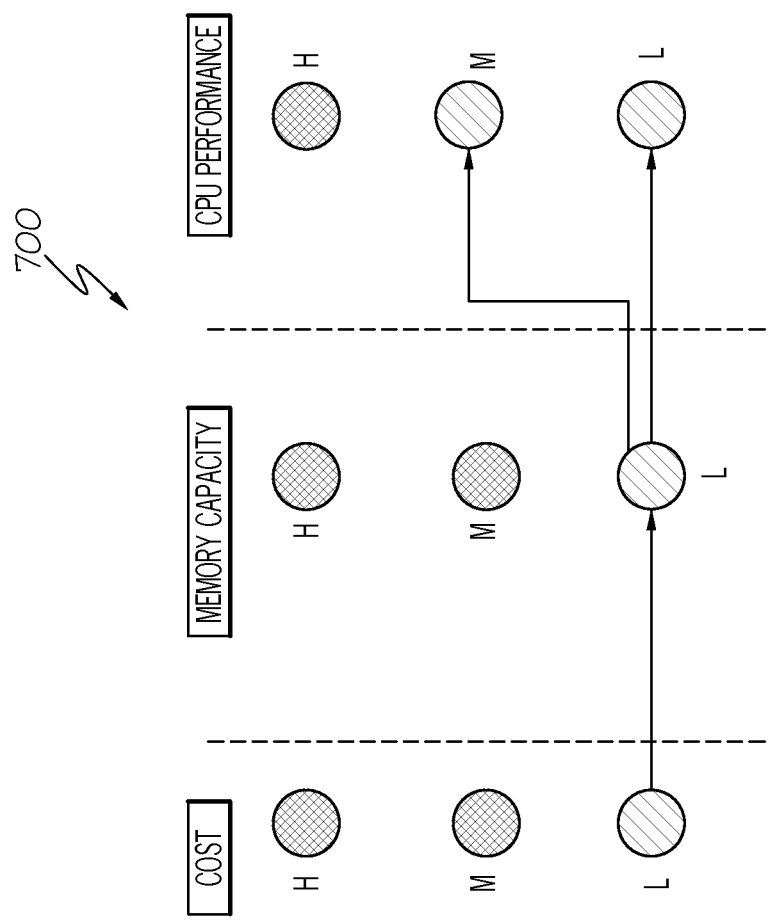
FIG. 7 is a dependency graph for illustrating the feasible combinations of workload attribute requirements for different levels of attribute priority that are supported by the hypervisor platforms of the pools of compute nodes in accordance with an embodiment of the present invention.

The principles of the present invention provide a means for selecting the hypervisor platforms that are best suited for satisfying the application workload requirements as discussed below in association with FIGS. 6 and 7. FIG. 6 is a flowchart of a method for selecting the hypervisor platforms that are best suited for satisfying the application workload requirements. FIG. 7 is a dependency graph for illustrating the feasible combinations of workload attribute requirements for different levels of attribute priority that are supported by the hypervisor platforms of the pools of compute nodes.

As discussed above, FIG. 6 is a flowchart of a method 600 for selecting the hypervisor platforms that are best suited for satisfying the application workload requirements in accordance with an embodiment of the present invention.

Referring to FIG. 6, in conjunction with FIGS. 1-5, in step 601, administrative server 303 receives the attribute requirements for an application workload. Examples of the attributes of the application workload include, but not limited to, Central Processing Unit (CPU) capacity, memory capacity, disk capacity, network capacity, CPU performance, memory performance, disk performance, network performance, power consumption, cost of service, reliability requirements and service level agreement policies. "Attribute requirements," as used herein, refer to the required level of performance concerning the attribute. For example, an application workload may require high CPU capacity, high CPU performance and low power consumption. Attribute requirements may be said to include a "rating level" which indicates the required level of performance. For instance, the attribute requirement of high CPU capacity may be said to include the rating level of "high."

In one embodiment, administrative server 303 may receive the attribute requirements for an application workload at the deployment submission time by the user (e.g., user of client device 101) of the workload. Furthermore, the attribute requirements for the application workload may be determined at runtime and stored as metadata with a deployment artifact. Administrative server 303 would then receive such attribute requirements (stored as metadata) at the deployment submission time via the deployment artifact. For example, the attribute requirements of the application workload may be determined based on observing the workload at runtime. For instance, the application workload may be determined to be highly input/output intensive based on the number of input/output operations requested to be performed. Such attribute requirements may be stored as metadata. In another example, the attribute requirements of the application workload may be determined based on previous deployments of the application workload which are stored as metadata with a deployment artifact.

Upon receiving the attribute requirements of the application workload, method 600 utilizes one of two approaches to identify the list of pools of compute nodes 302 that are best suited for satisfying the attribute requirements of the application workload as discussed below. One approach is discussed below in connection with steps 602-606; whereas, the other approach is discussed below in connection with steps 607-614.

In step 602, administrative server 303 constructs a tuple vector for the application workload using the attribute requirements of the application workload. For example, administrative server 303 may construct the tuple vector of <high CPU capacity, low memory capacity, low disk capacity, low cost and low power> based on the application workload's attribute requirements of high CPU capacity, low memory capacity, low disk capacity, low cost and low power.

In step 603, administrative server 303 constructs vector, referred to herein as the "hypervisor pool vector," for each hypervisor platform 409 of the pools of compute nodes 302 using the unique combination of characteristics of hypervisor platform 409 that correspond to a combination of attribute requirements. For example, hypervisor platform 409 for a pool of compute nodes 302 may exhibit the characteristics of having medium CPU/memory/disk capacity; high CPU and memory performance; low disk performance; medium cost; high power; and a low guarantee on SLA policies. These characteristics may be used to construct a hypervisor pool vector, such as <medium CPU capacity, medium memory capacity, medium disk capacity, high CPU performance, high memory performance, low disk performance, medium cost, high power and low guarantee on SLA policies>.

In step 604, administrative server 303 compares the tuple vector of the application workload with the hypervisor pool vector for each particular hypervisor platform 409 of the pools of compute nodes 302. That is, administrative server 303 compares the tuple vector of the application workload with the hypervisor pool vector for each pool of compute nodes 302 running a particular type of hypervisor platform 409.

In step 605, administrative server 303 applies a ranking algorithm to a list of pools of compute nodes 302 (e.g., compute nodes 302A-302B may represent one pool of compute nodes; whereas, compute nodes 302C-302E may represent another pool of compute nodes) using the comparison of step 604 to identify an ordered list of pools of compute nodes 302 that are best suited for satisfying the attribute requirements of the application workload. For example, the ranking algorithm may be based on minimizing the number of disagreements. Hence, the pools of compute nodes 302 with a hypervisor platform 409 that have a hypervisor pool vector with the fewest number of disagreements with the tuple vector of the application workload are identified. For instance, the hypervisor pool vector of <high CPU capacity, low memory capacity, low disk capacity, high cost and low power> only has a single disagreement with the tuple vector of <high CPU capacity, low memory capacity, low disk capacity, low cost and low power> and would be identified (i.e., the pool of compute nodes 302 with such a hypervisor platform 409 containing such a hypervisor pool vector) as having a higher ranking than other hypervisor platforms 409 (i.e., the pool of compute nodes 302 with other hypervisor platforms 409) with a hypervisor pool vector that has more than a single disagreement with the tuple vector of the application workload.

In another example, the ranking algorithm may be based on maximizing the number of agreements. Hence, the pools of compute nodes 302 with a hypervisor platform 409 that have a hypervisor pool vector with the greatest number of agreements with the tuple vector of the application workload are identified. For instance, the hypervisor pool vector of <high CPU capacity, low memory capacity, medium disk capacity, high CPU performance, high memory performance, low disk performance, low cost, high power and low guarantee on SLA policies> matches three attribute requirements with the tuple vector of <high CPU capacity, low memory capacity, low disk capacity, low cost and low power> and would be identified (i.e., the pool of compute nodes 302 with such a hypervisor platform 409 containing such a hypervisor pool vector) as having a higher ranking than other hypervisor platforms 409 (i.e., the pool of compute nodes 302 with other hypervisor platforms 409) with a hypervisor pool vector that matches with less than three attribute requirements with the tuple vector of the application workload. In this manner, the hypervisor platforms 409 that are best suited for satisfying the application workload requirements are identified.

In step 606, administrative server 303 displays, such as via a display of a user computing device (e.g., client device 101), the ordered list of the pools of compute nodes 302 that are best suited for satisfying the attribute requirements of the application workload.

An alternative approach to steps 602-606 is discussed below in connection with steps 607-614.

In step 607, administrative server 303 generates a dependency graph illustrating the feasible combinations of workload attribute requirements for different levels of attribute priority that are supported by hypervisor platforms 409 of the pools of compute nodes 302 as illustrated in FIG. 7.

FIG. 7 is a dependency graph 700 for illustrating the feasible combinations of workload attribute requirements for different levels of attribute priority that are supported by hypervisor platforms 409 (FIG. 4) of the pools of compute nodes 302 (FIG. 3) in accordance with an embodiment of the present invention.

Referring to FIG. 7, dependency graph 700 illustrates that the attribute of cost has the highest priority, followed by the attribute of memory capacity which has the second highest priority followed by the attribute of CPU performance which has the third highest priority. For the rating of "low" for the attribute of cost, the feasible combination includes a rating of "low" for the attribute of memory capacity and a rating of either "low" or "medium" for the attribute of CPU performance. These feasible combinations are identified by the arrows in FIG. 7. The infeasible combinations are shaded darker than the feasible combinations in FIG. 7. For example, the attribute requirement of low cost is not compatible with the attribute requirements of high CPU performance and high memory capacity. The terms "L," "M," and "H" in FIG. 7 correspond to the rating of "low," "medium" and "high," respectively.

Returning to FIG. 6, in conjunction with FIGS. 1-5 and 7, in step 608, administrative server 303 receives a level of priority from the user (e.g., user of client device 101) for each attribute requirement of the application workload to form a list of workload attribute requirements in order of priority, where, as discussed above, each received attribute requirement is assigned a rating level. For example, for the attribute requirements of low cost, high CPU performance and high memory capacity, the user may assign having low cost with the highest priority, followed by high memory capacity and high CPU performance to form a list of attribute requirements of the application workload in order of priority as follows: low cost, high memory capacity and high CPU performance.

In step 609, administrative server 303 applies dependency graph 700 to the list of attribute requirements of the application workload in order of priority to determine if the attribute requirements of the application workload based on priority are supported by a hypervisor platform 409 of the pools of compute nodes 302. For instance, referring to the example discussed in step 608, administrative server 303 applies dependency graph 700 to the list (list of attribute requirements in order of priority) of low cost, high memory capacity and high CPU performance to determine if such a combination of attribute requirements of the application workload based on priority are supported by a hypervisor platform 409 of the pools of compute nodes 302. As illustrated in FIG. 7, when the attribute requirement of low cost has the highest priority, the combination of high memory capacity (second highest priority) and high CPU performance (third highest priority) is infeasible. That is, there are no hypervisor platforms 409 that support the attribute requirements of the application workload based on priority.

In step 610, a determination is made by administrative server 303 as to whether the attribute requirements of the application workload based on priority are supported by a hypervisor platform 409 of the pools of compute nodes 302.

If the attribute requirements of the application workload based on priority are not supported by a hypervisor platform 409 of the pools of compute nodes 302, then, in step 611, administrative server 303 informs the user that the attribute requirements of application workload based on priority are not supported by a hypervisor platform 409 and to provide different levels of priority and/or rating levels for the workload attributes. Administrative server 303 then receives different levels of priority and/or rating levels for the workload attributes from the user (e.g., user of client device 101) in step 608.

If, however, the attribute requirements of the application workload based on priority are supported by a hypervisor platform 409 of the pools of compute nodes 302, then, in step 612, administrative server 303 applies a ranking algorithm to a list of pools of compute nodes 302 by comparing the list of attribute requirements of the application workload in order of priority with the hypervisor characteristics of the pools of compute nodes 302 to identify an ordered list of pools of compute nodes 302 that are best suited for satisfying the attribute requirements of the application workload based on the received level of priorities. For example, the ranking algorithm may be based on minimizing the number of disagreements while assigning a higher weight to those attribute requirements with a higher priority. Hence, those pools of compute nodes 302 with a hypervisor platform 409 with the fewest number of disagreements while satisfying those attribute requirements with the highest priorities will be identified.

In another example, the ranking algorithm may be based on maximizing the number of agreements while assigning a higher weight to those attribute requirements with a higher priority. Hence, those pools of compute nodes 302 with a hypervisor platform 409 with the greatest number of agreements while satisfying those attribute requirements with the highest priorities will be identified.

In a further example, the ranking algorithm may simply be based on selecting those pools of compute nodes 302 with a hypervisor platform 409 that satisfies the attribute requirement with the highest priority regardless of the other attribute requirements.

In step 613, administrative server 303 displays, such as via a display of a user computing device (e.g., client device 101), the ordered list of the pools of compute nodes 302 that are best suited for satisfying the attribute requirements of the application workload based on the received level of priorities.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer program product for selecting hypervisor platforms that are best suited to process application workloads, the computer program product comprising a computer readable storage medium having program code embodied therewith, the program code comprising the programming instructions for:

receiving attribute requirements for an application workload;

applying a ranking algorithm to a list of pools of compute nodes to identify an ordered list of pools of compute nodes that are best suited for satisfying said attribute requirements of said application workload by comparing hypervisor characteristics of said pools of compute nodes with said attribute requirements of said application workload, wherein each of said pools of compute nodes comprises a set of compute nodes that run on a particular hypervisor platform, wherein said particular hypervisor platform has a unique combination of characteristics that correspond to a combination of a set of attribute requirements; and displaying said ordered list of pools of compute nodes that are best suited for satisfying said attribute requirements of said application workload.

2. The computer program product as recited in claim 1, wherein the program code further comprises the programming instructions for:

constructing a tuple vector for said application workload using said attribute requirements of said application workload; and constructing a vector for each particular hypervisor platform of said pools of compute nodes using said unique combination of characteristics of said particular hypervisor platform.

3. The computer program product as recited in claim 2, wherein the program code further comprises the programming instructions for:

comparing said tuple vector of said application workload with said vector for each particular hypervisor platform of said pools of compute nodes; and applying said ranking algorithm to said list of pools of compute nodes using said comparison.

4. The computer program product as recited in claim 1, wherein the program code further comprises the programming instructions for:

generating a dependency graph illustrating feasible combinations of workload attribute requirements for different levels of attribute priority that are supported by hypervisor platforms of said pools of compute nodes.

5. The computer program product as recited in claim 4, wherein the program code further comprises the programming instructions for:

receiving a level of priority for each received attribute requirement of said application workload to form a list of attribute requirements of said application workload in order of priority;

applying said dependency graph to said list of attribute requirements of said application workload in order of priority to determine if said attribute requirements of said application workload based on priority are supported by a hypervisor platform of said pools of compute nodes.

6. The computer program product as recited in claim 1, wherein the program code further comprises the programming instructions for:

receiving a level of priority for each received attribute requirement of said application workload to form a list of attribute requirements of said application workload in order of priority;

applying said ranking algorithm to said list of pools of compute nodes by comparing said list of attribute requirements of said application workload in order of priority with said hypervisor characteristics of said pools of compute nodes to identify said ordered list of pools of compute nodes that are best suited for satisfying said attribute requirements of said application workload based on said received level of priorities; and displaying said ordered list of pools of compute nodes that are best suited for satisfying said attribute requirements of said application workload based on said received level of priorities.

7. The computer program product as recited in claim 1, wherein attributes of said application workload comprise one or more of the following: Central Processing Unit (CPU) capacity, memory capacity, disk capacity, network capacity, CPU performance, memory performance, disk performance, network performance, power consumption, cost of service, reliability requirements and service level agreement policies.

8. A system, comprising:

a memory unit for storing a computer program for selecting hypervisor platforms that are best suited to process application workloads; and a processor coupled to the memory unit, wherein the processor is configured to execute the program instructions of the computer program comprising:

receiving attribute requirements for an application workload;

applying a ranking algorithm to a list of pools of compute nodes to identify an ordered list of pools of compute nodes that are best suited for satisfying said attribute requirements of said application workload by comparing hypervisor characteristics of said pools of compute nodes with said attribute requirements of said application workload, wherein each of said pools of compute nodes comprises a set of compute nodes that run on a particular hypervisor platform, wherein said particular hypervisor platform has a unique combination of characteristics that correspond to a combination of a set of attribute requirements; and displaying said ordered list of pools of compute nodes that are best suited for satisfying said attribute requirements of said application workload.

9. The system as recited in claim 8, wherein the program instructions of the computer program further comprises:

constructing a tuple vector for said application workload using said attribute requirements of said application workload; and constructing a vector for each particular hypervisor platform of said pools of compute nodes using said unique combination of characteristics of said particular hypervisor platform.

10. The system as recited in claim 9, wherein the program instructions of the computer program further comprises:

comparing said tuple vector of said application workload with said vector for each particular hypervisor platform of said pools of compute nodes; and applying said ranking algorithm to said list of pools of compute nodes using said comparison.

11. The system as recited in claim 8, wherein the program instructions of the computer program further comprises:

generating a dependency graph illustrating feasible combinations of workload attribute requirements for different levels of attribute priority that are supported by hypervisor platforms of said pools of compute nodes.

12. The system as recited in claim 11, wherein the program instructions of the computer program further comprises:
receiving a level of priority for each received attribute requirement of said application workload to form a list of attribute requirements of said application workload in order of priority;
applying said dependency graph to said list of attribute requirements of said application workload in order of priority to determine if said attribute requirements of said application workload based on priority are supported by a hypervisor platform of said pools of compute nodes.

13. The system as recited in claim 8, wherein the program instructions of the computer program further comprises:
receiving a level of priority for each received attribute requirement of said application workload to form a list of attribute requirements of said application workload in order of priority;
applying said ranking algorithm to said list of pools of compute nodes by comparing said list of attribute requirements of said application workload in order of priority with said hypervisor characteristics of said pools of compute nodes to identify said ordered list of pools of compute nodes that are best suited for satisfying said attribute requirements of said application workload based on said received level of priorities; and
displaying said ordered list of pools of compute nodes that are best suited for satisfying said attribute requirements of said application workload based on said received level of priorities.

14. The system as recited in claim 8, wherein attributes of said application workload comprise one or more of the following: Central Processing Unit (CPU) capacity, memory capacity, disk capacity, network capacity, CPU performance, memory performance, disk performance, network performance, power consumption, cost of service, reliability requirements and service level agreement policies.

* * * * *